(12) United States Patent
Hines, Sr.

(10) Patent No.: US 12,714,059 B2
(45) Date of Patent: Aug. 25, 2026

(54) ANIMAL TOILET

(71) Applicant: Shawn Demetrius Hines, Sr., Davenport, FL (US)

(72) Inventor: Shawn Demetrius Hines, Sr., Davenport, FL (US)

(73) Assignee: Shawn D. Hines, Sr., Daven port, FL (US)

( * ) Notice: Subject to any disclaimer, the term of this patent is extended or adjusted under 35 U.S.C. 154(b) by 0 days.

(21) Appl. No.: 18/445,892

(22) Filed: Mar. 8, 2024

(65) Prior Publication Data

US 2025/0280786 A1 Sep. 11, 2025

(51) Int. Cl.
*A01K 1/01* (2006.01)

(52) U.S. Cl.
CPC .......... *A01K 1/0117* (2013.01); *A01K 1/0107* (2013.01); *A01K 1/011* (2013.01)

(58) Field of Classification Search
CPC .............................. A01K 1/0107; A01K 1/011
See application file for complete search history.

(56) References Cited

U.S. PATENT DOCUMENTS 2,883,963 A * 4/1959 Scott .................... A01K 1/0107 119/161
3,842,803 A * 10/1974 Temel .................... A01K 1/011 119/163
3,921,582 A * 11/1975 Sedlmeir .............. A01K 1/0107 119/161
5,279,258 A * 1/1994 Kakuta ................ A01K 1/0117 119/164
2004/0011297 A1* 1/2004 Hochman ............ A01K 1/0107 119/165
2004/0163604 A1* 8/2004 Kirk ..................... A01K 1/0121 119/166
2005/0284392 A1* 12/2005 Hillman ............... A01K 1/0107 119/169
2006/0156992 A1* 7/2006 Costa .................. A01K 1/0107 119/161
2010/0122662 A1* 5/2010 Kennington ........... A01K 1/011 422/291

FOREIGN PATENT DOCUMENTS

DE 20303400 U1 * 9/2003 ........... A01K 1/0107
KR 101005587 B1 * 1/2011

* cited by examiner

*Primary Examiner* — Christopher D Hutchens

(57) ABSTRACT

An automatic animal toilet with a cleaning head/vacuum and a secondary conveyor for solid waste, for eliminating the need of manual waste removal by separating the liquid waste from the solid by heat sealing the solid waste in a bag. It is equipped with a permeable toileting surface, a catchment surface/tray underlying the toileting surface to collect and channel liquids, and a drain. The toileting surface is equipped with a rinsing element, cleaning cover and cleaning head/vacuum to remove liquid and solid residue waste from the platform base/toilet surface. It is also equipped with a water tank with a heating element, solar panel, battery backup system, waste receptacle and a secondary solid waste removal conveyor system. The drain is equipped with tubing to convey the liquid to a convenient disposal location. The unit will include a ramp, so that the animal can utilize the device safely.

6 Claims, 10 Drawing Sheets fig #1
TOP VIEW - BASE
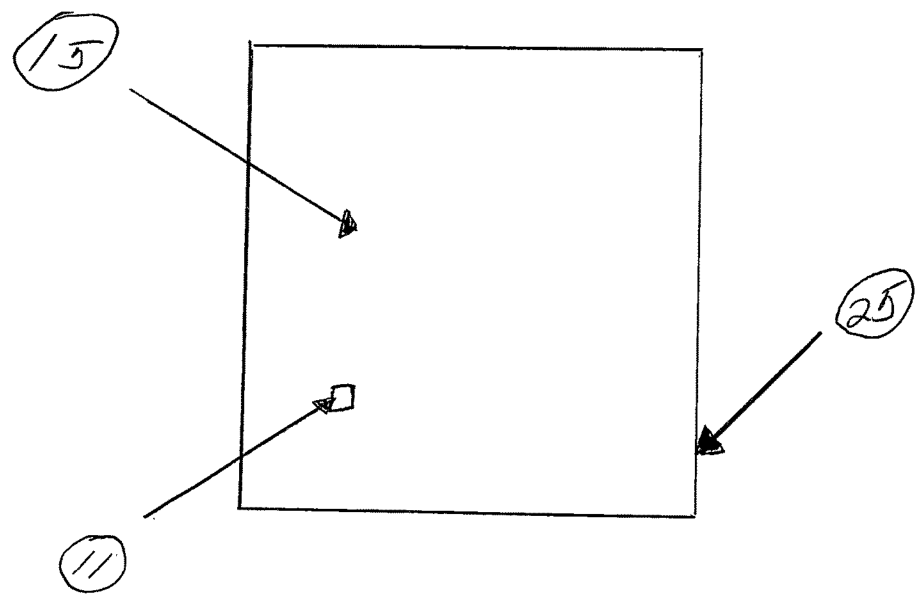

fig #2
SIDEVIEW - MAIN CHAMBER
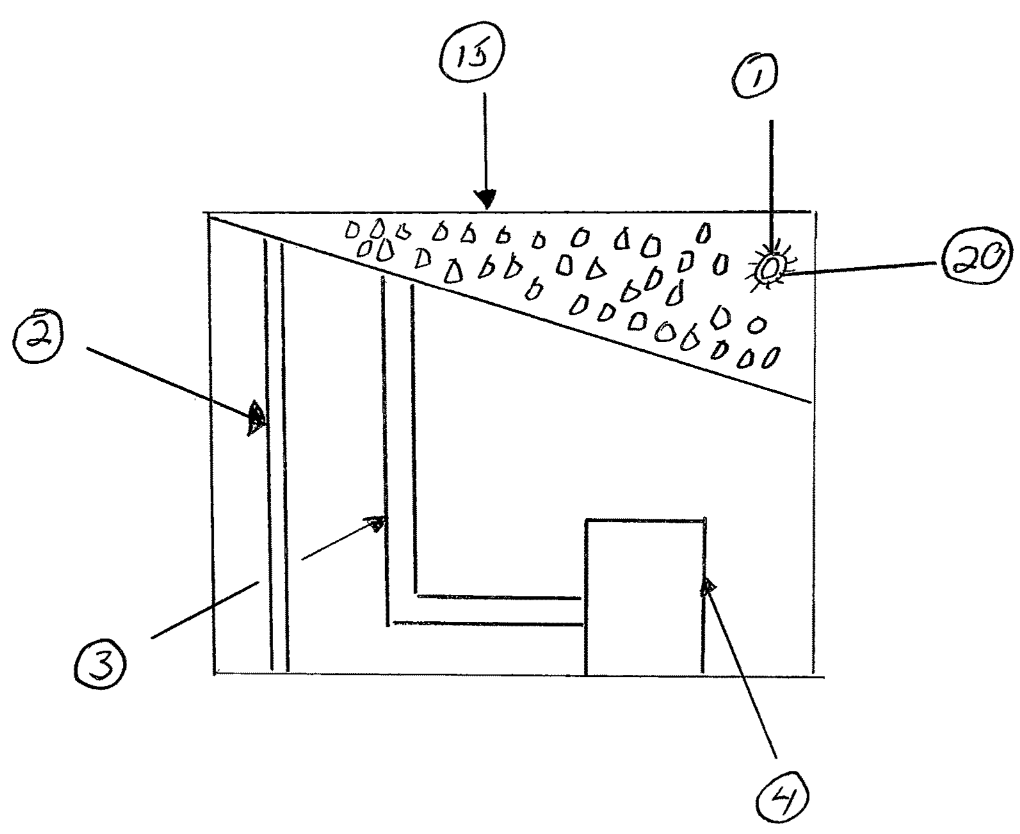

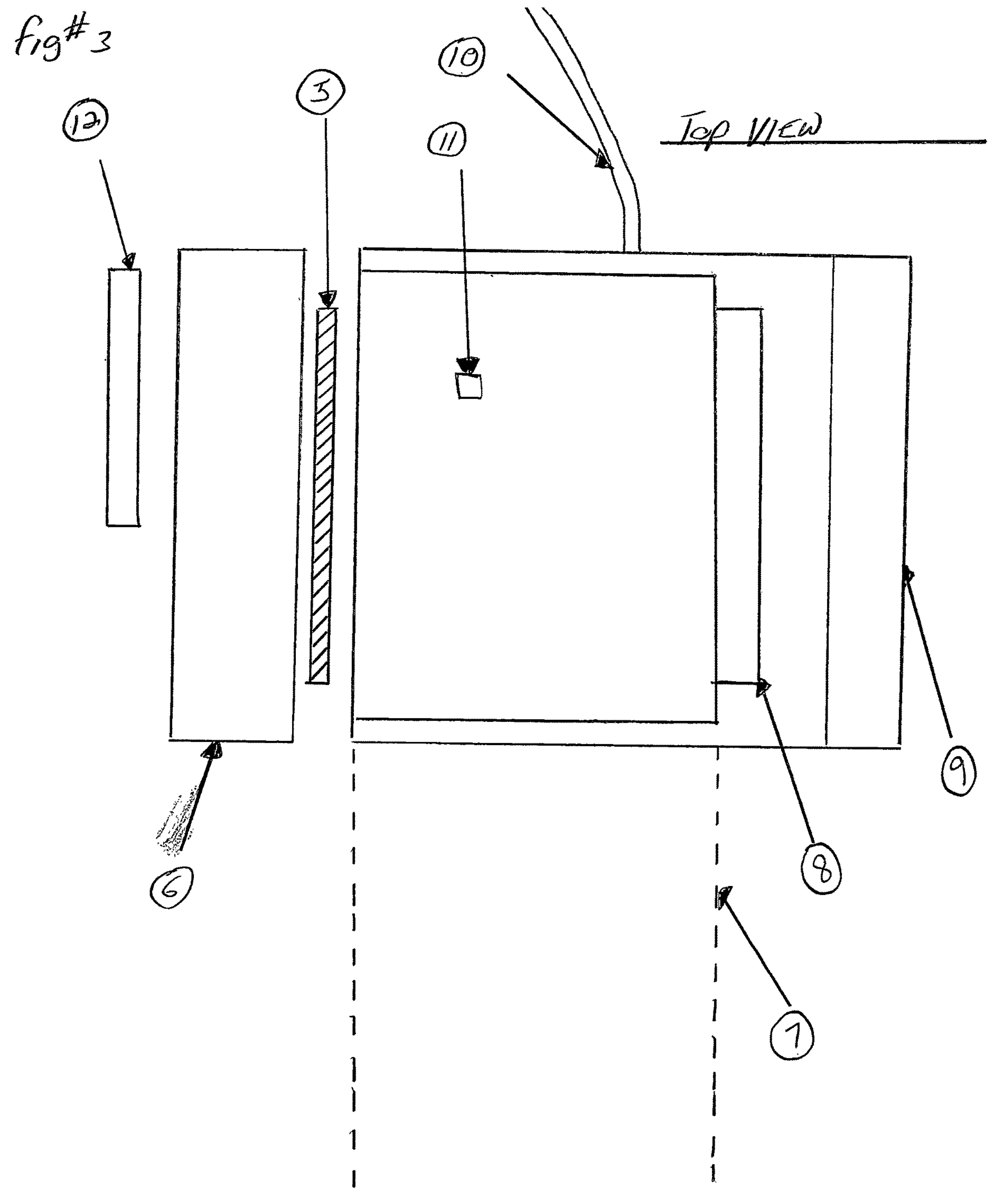
fig# 3
12
3
10
11
TOP VIEW
6
8
9
7

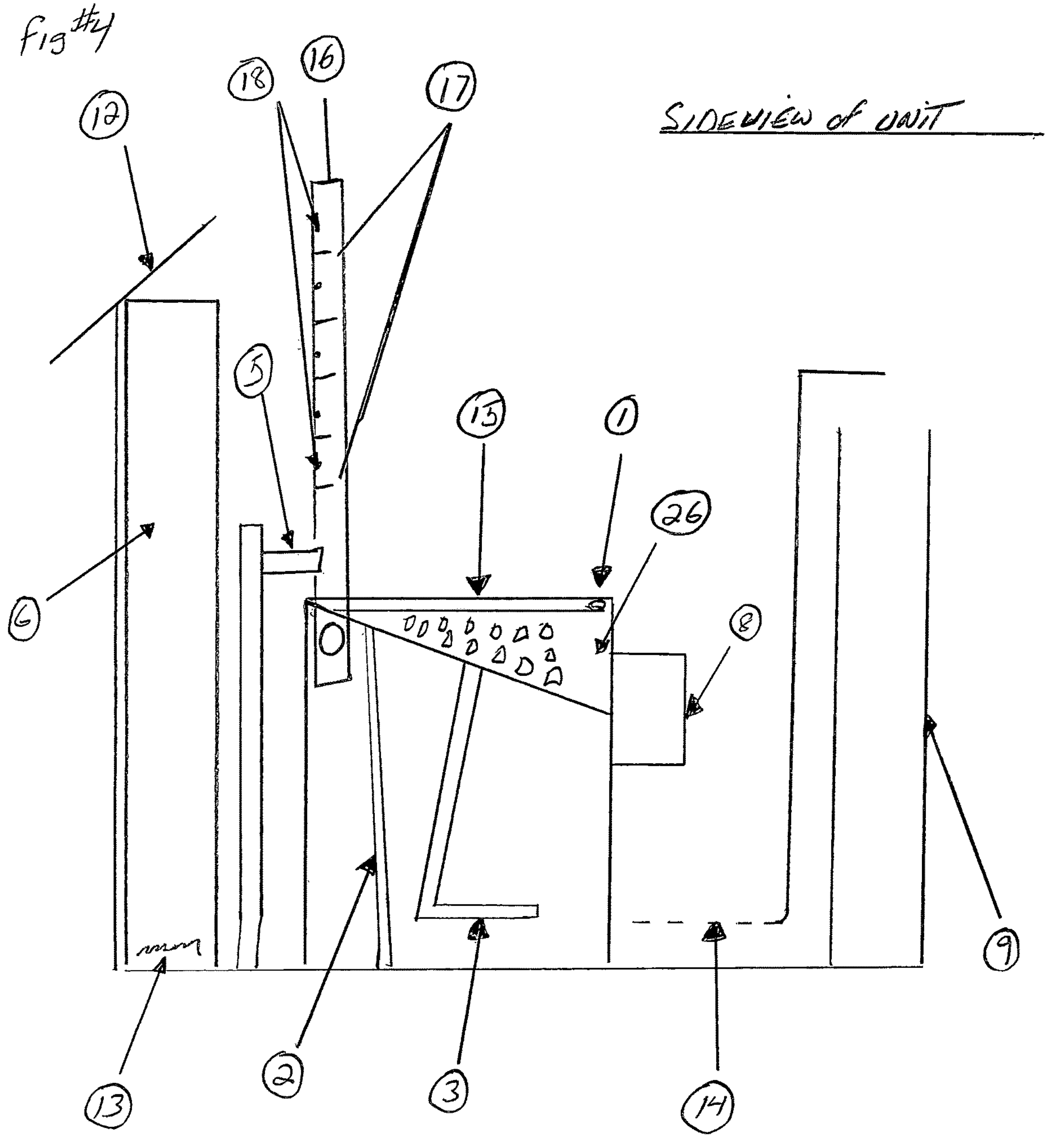
fig #4
SIDEVIEW of UNIT
12
18
16
17
5
15
1
26
6
8
9
13
2
3
14 fig #5
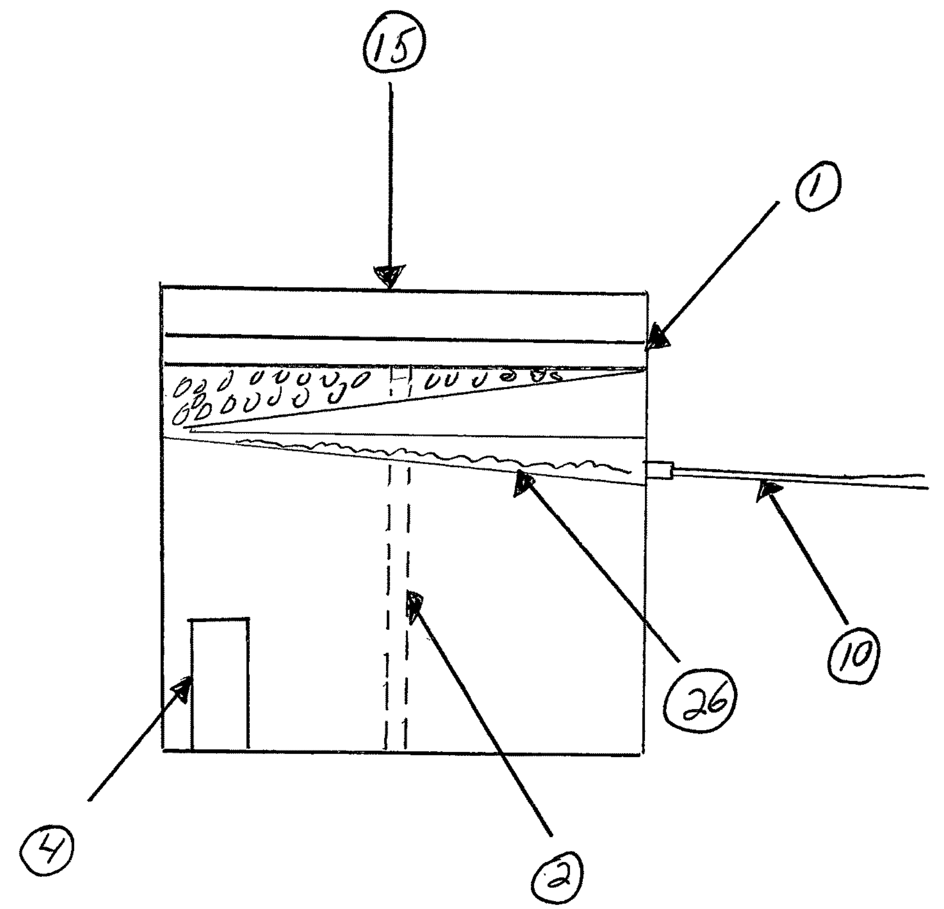

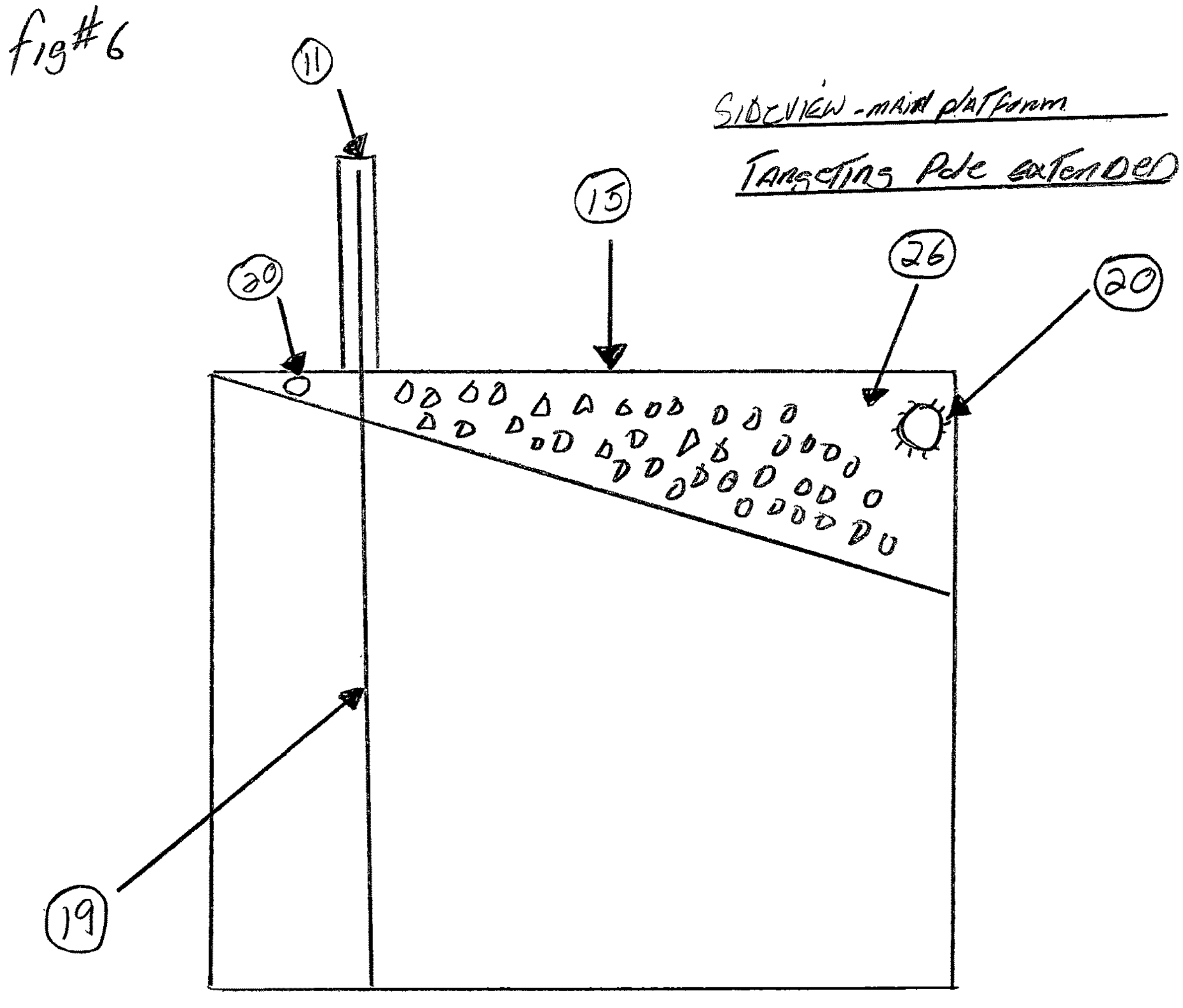
fig#6
11
SIDEVIEW - MAIN PLATFORM
TARGETING POLE EXTENDED
15
26
20
20
19

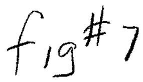
fig#7
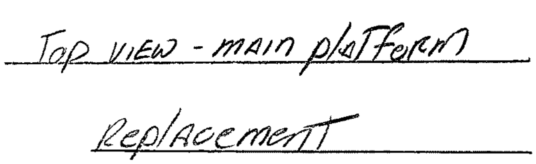
Top view - main platform
Replacement
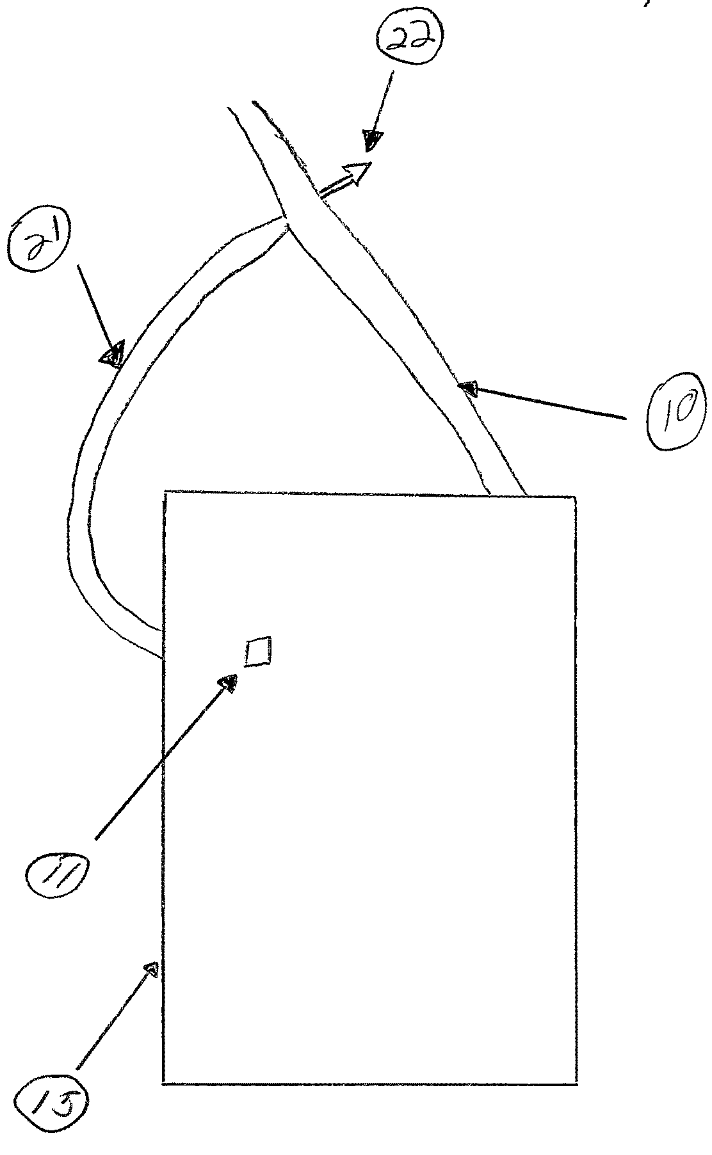
22
21
10
11
15

Fig#8
main platform + surface
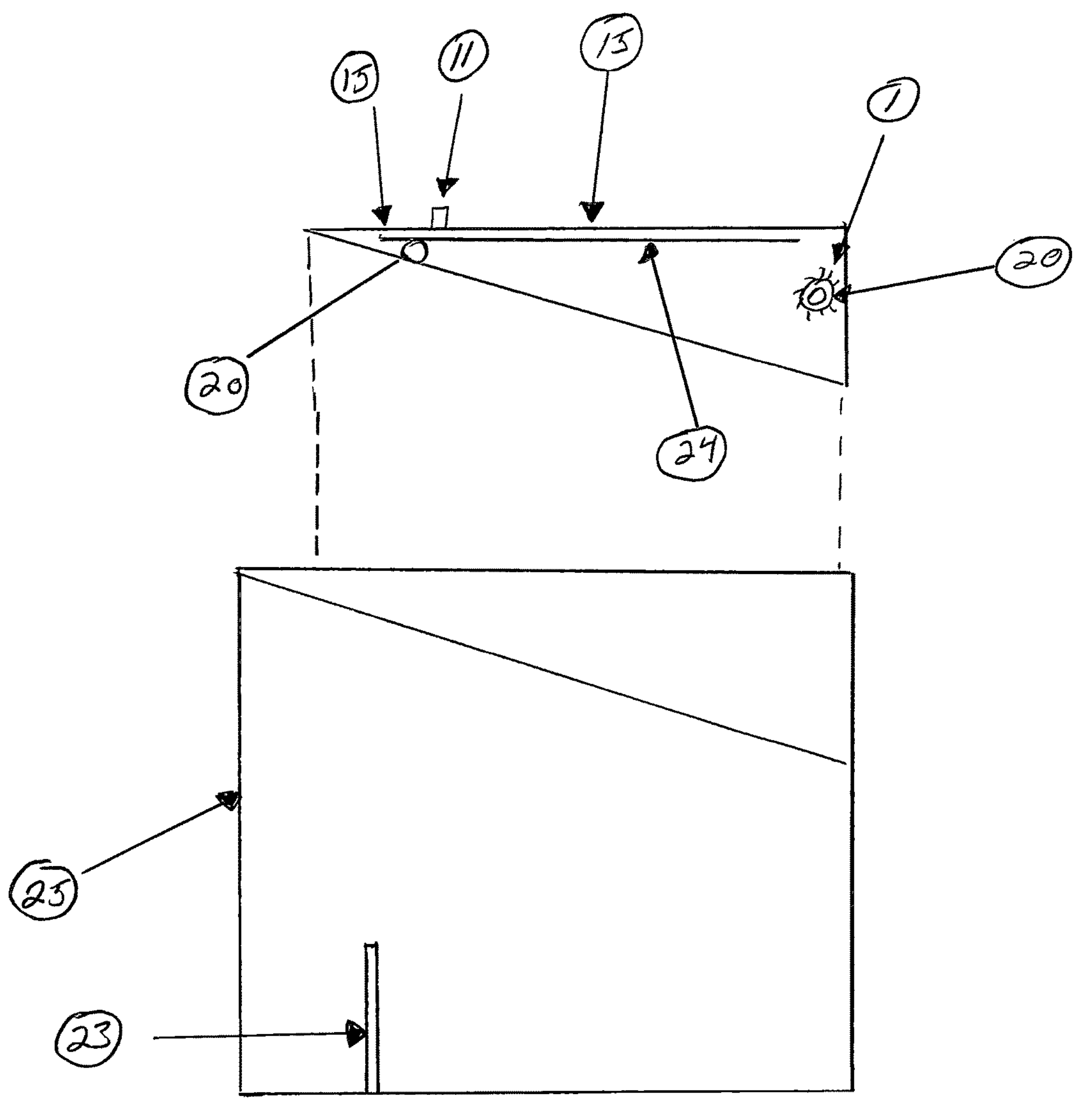

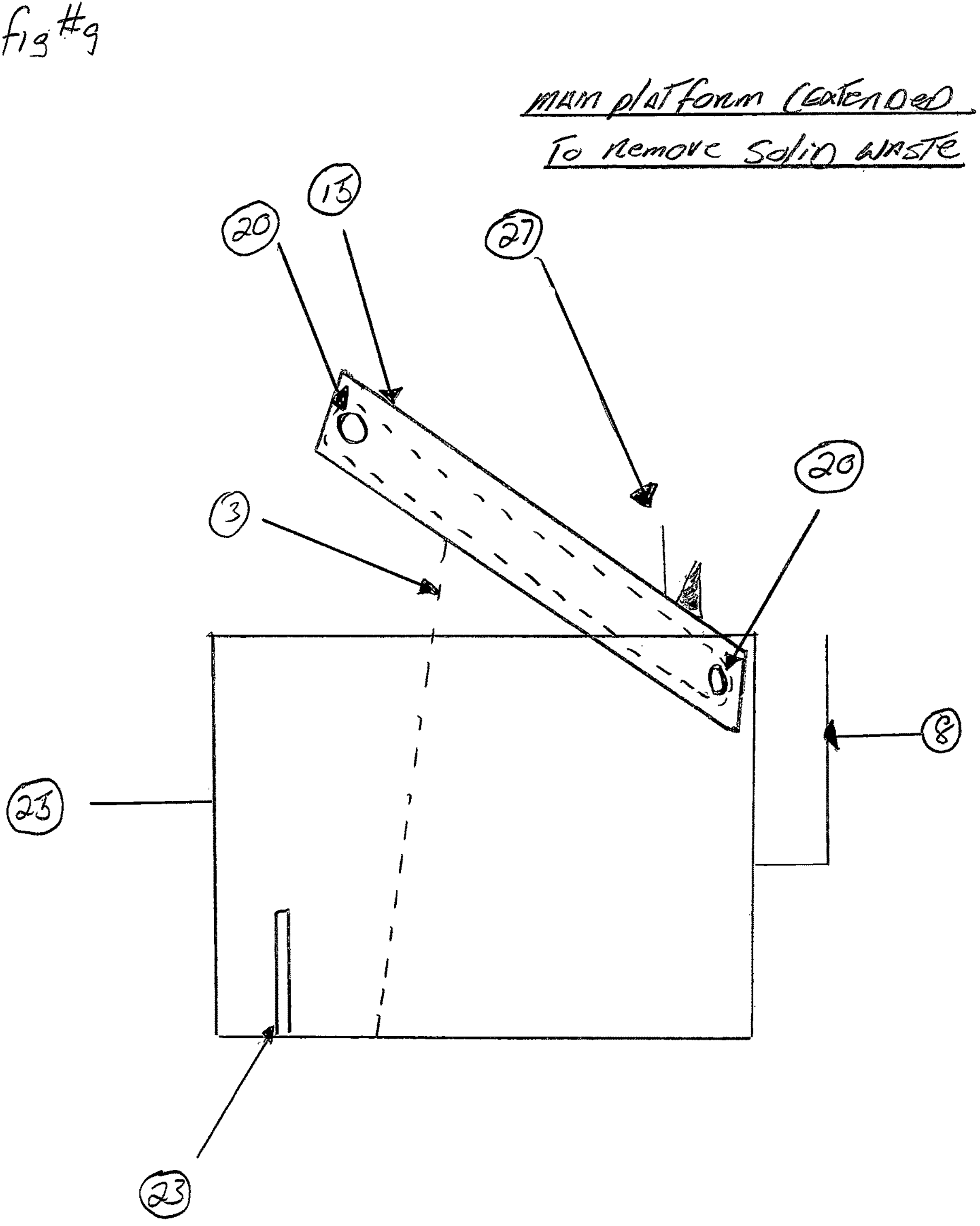
fig #9
main platform extended
To remove solid waste
20
13
27
20
3
8
23
23

Fig#10
Main platform w/ cleaning cover Down
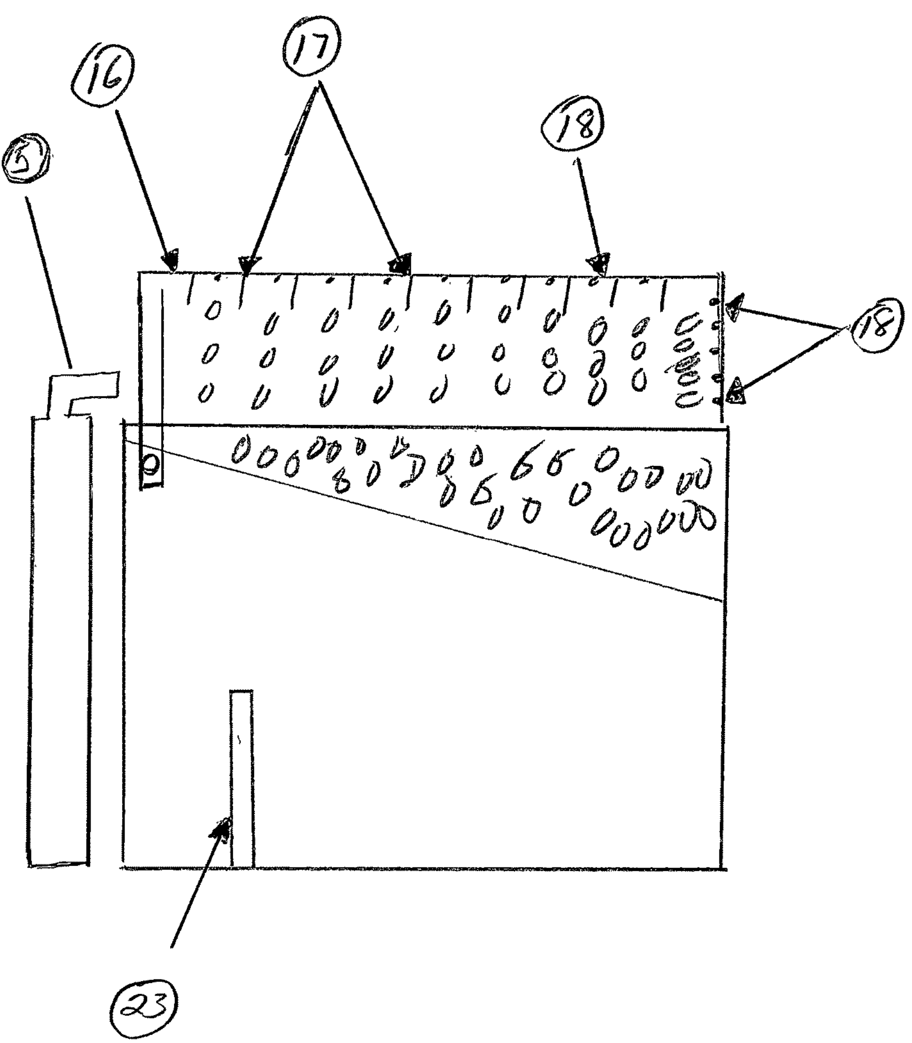

ANIMAL TOILET

CROSS REFERENCE TO RELATED APPLICATIONS

At this time, there are no cross references for this invention.

BACKGROUND OF THE INVENTION

While looking at the needs of where an animal can go to relieve themselves, we come up with a few challenges. One, it's not always convenient for the owners or the animal to go outside. The second challenge is that, we're in the 21st century and we are still using our hands to pick up animal waste. we live in one of the most technological advance countries in the world. The ability to have an automatic animal cleaning system is long overdue. Although the idea for this device is to be used primarily outdoors, with the use of a solar panel, it can also be used indoors with AC or DC power.

Back to the first challenge. This can be very challenging to those of us who take care of our pets. This invention is designed to combat the concern for walking in your yard and having to constantly be aware of your surrounding and where you are stepping. This device can be installed within the neighborhoods to combat this very problem as well.

Another problem is with the way we deal with larger animals and their waste is noncommittal. In other words, we ignore the large animals because no one has come up with a plan to accommodate them. At this time, people are catering to the smaller animals without any concerns for the larger ones. The cleaning system will keep your home smelling like a home, instead of your animal. If the animal is trained properly, there would be less concerns about where you step in your yard as well.

Automated animal bathroom presently can not accommodate the weight of large animals. In order to have a properly cleaned surface and waste disposal process, the unit needs to be able to handle the weight of a larger animal. By properly reinforcing the base, to include adding aluminum rods and a reinforcement support plate, we can insure the animals safely and proper waste disposal. The animal toilet would allow proper waste disposal for large animals. Liquid or solid waste can be dispose of automatically once the animal has left the device. The automated system would be equipped with a permeable surface to collect and channel liquid waste and divert the liquid waste to a drain on the side of the unit. The system will also be equipped with a cleaning blade to move the solid waste into position to be received by the receptacle for solid waste removal.

Once the blade is in position, the platform base will move forward, then tilt to dispose of the solid waste into the waste receptacle. The waste receptacle will be equipped with a continuous bag system. Once the waste is deposited into the bottom of the receptacle, a heating element will seal the waste into a small bag, while simultaneously creating the bottom for the new bag for future use. After the bag is sealed, a knife will cut the bag, the small bag of waste will then drop down to a conveyor belt system. The conveyor will transport the bag of solid waste to a trash receptacle.

TECHNICAL FIELD OF THE INVENTION

This invention relates to an animal toilet.

SUMMARY OF INVENTION

A brief description of the device, it should be known as an animal bathroom and it goes as follows. It consist of a platform/toilet surface, a convenience ramp, a water reservoir (with heating coil), a solar panel, a solid waste receptacle (with a heating element/cutting blade) and a cleaning head/vacuum. In addition to the unit, a conveyor with a trash receptacle/can will be added for hands free maintenance. The unit is also be equipped with a targeting pole and high sides to protect from over spray. The base is equipped with a turf like material on it to act as cover for the base unit. Liquid waste and rinse water will flow down through the base into a catch/drain system, feed by gravity, out to the yard or a container. This system is equipped with a catch basin, set at an angle to direct the liquid waste towards the hose/tube. The liquid waste and rinse water is redirected and channeled to a drain hose which can be directed to a flower bed, or for inside use a drain in the floor, or a rain gutter drain, or anywhere waste can be disposed of properly.

Before the platform lifts up, the surface area is designed to rotate forward and move the waste towards the leading edge, in order to position the waste for the receptacle. The platform is equipped with a hydraulic jack mechanism to lift the platform into position. Once the waste has been collected, the base is designed to return to its original configuration. The unit is also equipped with a water reservoir, with a heating element at the bottom of the tank. This will also make the cleaning/vacuum head more efficient when cleaning the blade and the platform.

The cleaning cover is equipped with water nozzles and sensors to identify where exactly the solid waste is located. Once the sensors determine the places of the solid waste, the cover is design to retreat back to its place of origin. The waste receptacle is move into alignment with the solid waste before the toileting area rotates forward and then begin to lift the platform. The platform will return to its place of origin for cleaning. Once the waste is collected into the solid waste receptacle, the cleaning cover is move back into place and commence cleaning. The cover is design with cleaning spray nozzles and sensors to identify solid waste. The nozzles is design to dispense warm/hot water for cleaning and a disinfectant for deodorizing.

The solid waste is identified by a sensor placed in the cleaning cover. The receptacle is design to move into position. The platform will move forward to place the solid waste into position for removal. The blade is design to move the waste to the front edge of the platform, to be received by the solid waste receptacle. The solid waste receptacle is design to activate at the same time, opening its top cover in order to accept the solid waste. The platform is design to tilt towards the leading edge, from the back of the unit and deposit the solid waste in the receptacle. This is done so that the solid waste doesn't have far to go, in order to minimize spillage. The solid waste receptacle is design to have a continuous bag system. Once the waste is deposited, a heating element is design to seal the bag and a cutting blade is in place to remove the bag with the waste, while simultaneously creating a new bag for future use. Once the blade has cut, the bag of waste will process to another phase of its journey to the conveyor. Once the bag is sealed, technically the process is done. This unit is also equipped with a conveyor and garbage/trash can which is design to make the system hands free. Once the solid waste bag lands on the conveyor, a sensor is activated by the system and transports the bag to the trash receptacle.

The conveyor system is designed to move horizontally to bypass the solid waste receptacle, then go vertically to reach the top of the garbage can in order to dispose of the bag of solid waste. After all the waste is removed and the base is back into position, the cleaning will commence. A cleaning cover is moved back into position over the platform surface. The cleaning cover is equipped with multiple spray nozzles for liquid to clean and sensors to locate the solid waste when needed. A vacuum/cleaning head is moved into position and clean the blade, platform and surface of the unit. Before the cleaning cover moves into position over the platform surface, the targeting pole will retreat to its holding position, within the unit's base. Once the cleaning is completed, the targeting pole and targeting pole grommet will return to their place of origin and fully extended.

By installing and utilizing a heating coil at the bottom of the water reservoir/tank, the cleaning head will become more efficient to liquify all residual waste and channel it through the liquid catch basin below the platform of the unit and through the vacuum hose waste tube. Once the vacuum has performed its job and returned to it holding position, the unit is ready for the next time the animal needs to use the bathroom. The heating element/coil at the bottom of the water tank is crucial for the removal of all solid waste that may be left behind on the platform. The unit is powered by a solar panel for those living in the regions with an abundance of sunlight. If will also be equipped with backup lithium batteries to power the system should daylight not be available for a short period of time.

For other places, the system is equipped with an AC plug or DC power. This device can be used for home, work or any other place AC power is in use. For indoor use, a disposable pad can be used in the event the solar panel or power is not available for some period of time.

The system is also be equipped with a scale/monitoring system, in order to transmit the weight of the animal to an app or similar programs.

A remote control app and override system will be in place in order to identify problems such as low water, or if the trash can is full. Several sensors will be installed in the ramp to insure the safety of the animal. This will ensure that the unit will not activate while the animal is on the platform. A sensor for the battery (low battery), solar panel operations and performance is installed as well. Bag changing sensor and clogged liquid waste sensor will also installed. This will all be controlled by an app, sent to your phone, tablet or other electronic device.

BRIEF DESCRIPTION OF THE DRAWINGS

FIG. 1 is a top view of the main toileting surface

FIG. 2 is an assembled view perspective of the embodiment of the animal toilet with a hydraulic jack.

FIG. 3 is a top view of the embodiment of the animal toilet and its operation FIG. 4 is a perspective assembled view of an embodiment of the animal toilet with a solar panel, cleaning cover with sensors, cleaning head/vacuum, platform, hydraulic jack, aluminum support rod, waste receptacle, and conveyor system.

FIG. 5 is a perspective assembled view of an embodiment of the animal toilet with a platform, base aluminum support beam, liquid waste tube, base support beam, jack motor and battery housing, and liquid waste channel.

FIG. 6 is a side view of an embodiment of the animal toilet with a targeting pole extended and gears for the moving platform surface/conveyor.

FIG. 7 is a top view perspective of the embodiment of an animal toilet with the base, a targeting pole grommet, disposal tubes with a relief valve.

FIG. 8 is a cross section view of an embodiment of the animal toilet, a targeting pole retracted and platform surface with gears and a targeting grommet and a reinforced support plate.

FIG. 9 is a side view perspective of the platform raised during solid waste disposal. It also shows the targeting pole in a retracted position.

FIG. 10 is a side view perspective of the platform during cleaning. It shows the cleaning head/vacuum, water spray nozzles and sensors. This view also shows the targeting pole in a retracted position.

DESCRIPTION OF THE PREFERRED EMBODIMENT(S)

The detailed description set forth below is in connection with the appended drawings it is intended as a description of presently-preferred embodiments of the invention and is not intended to represent the only forms in which the present invention may be constructed and/or utilized. The description set forth the functions and the sequence of steps for the constructing and operating the inventions connection with the illustrated embodiments. However, it is to be understood that the same or equivalent functions and sequences may be accomplished by different embodiments that are also intended to be encompassed within the spirit and scope of the invention.

In an embodiment, the animal toileting device comprised of a platform 15, which may be made out of wood, plastic, aluminum or other suitable material. As shown in FIGS. 4, the platform will be connected with a catchment surface 26. This lip has at least one substantially vertical surface. The catchment surface may be flat, or it may be sloped or generally concave. Alternatively, the platform 15 and the catchment surface 26 is gravity feeding and may be formed as a single piece, such as with plastic injection molding with a separation. As shown in FIGS. 5,26 In such a separate catchment surface, the substantially vertical surfaces of the platform and/or lip may be set at a draft angle that will allow for easy stacking of the platforms, which reduces the space necessary to store and ship bulk quantities of the animal toileting devices. The catchment surface may comprised of the toileting surface 15 or may be overlaid by a separate toileting surface.

As shown in FIG. 5. The catchment surface 26 may be sloped, and equipped with one or more drainage channels 10. The catchment channels 26 may be sloped down to a drain 10, which comprises of a hole in side of the catchment surface, preferably at its lowest point.

As shown in FIG. 7 The drainage channels may be widely spaced and configured to run from the edges and the corners of the catchment surface or in any suitable arrangement. Alternatively, the catchment surface may be sloped or generally con-caved with a drain preferably at the low point. 10 The collection element may be a simple catch basin and hose to collect liquid wastes for eventual manual disposal 10 and 21. A relief valve 22 will be installed to ensure there will be no chance for the waste water to backup into the unit. The catch basin may be placed on the inside walls of the platform base. As shown in FIGS. 4, alternatively, the catchment surface and/or some portion of the platform may be removable and/or fitted with a hinge, so that it can be lifted to access the catch basin. 26 As shown in FIG. 3 The unit will be equipped with an animal ramp 7 to ensure the safety of the animals entry and departure from the unit.

Alternatively as shown in FIGS. 5, the collection element 26 will comprise of a fitting that couples with the drain and is attached to a disposal tube 10, such as a hose, piping, or other liquid conveyance, which can then be ran to any convenient disposal location. Such disposal locations may include patio drains, floor drains, rain gutter, flower beds, storm drains, toilets or sanitary sewers. As shown in FIG. 7 One tube 21 would be for the cleaning head/vacuum. And the other tube will be from the main catchment system. Both will be equipment with a relief valve 22 to insure that the system is protected from any back flow issues. The relief valve will open if any liquid is detected coming back up the tube. Since the discharge is primarily water and a deodorizer, the odor from the waste in not likely to be an issue. Also, the disposal location could be a small hole, which would allow all the liquid to drain into the soil without being present at the drain opening, or secured below the drain opening without touching the opening, or various other methods that are suitable for the disposal tube to collect any material that falls through the drain opening. 10 A toileting surface 15 is used atop of the catchment surface.

As shown in FIG. 4, such toileting surfaces will be comprise of live grass, permeable artificial turf, grating, grills, slotted or perforated surfaces, or other suitable material capable of draining liquids onto the catchment surface. In a preferred embodiment, the toileting surface will be a soil-less grass sod. This sod will act as a "training" toileting surface 15, as animals are familiar with natural grass and tend to be attached to such surfaces for toileting. Being soil-less, this sod does not lose soil or create a muddy residue that can clog the drain or the collection element. The pet liquid waste may tend to burn real grass and thus it may eventually die, although some grasses are more resistant to burning than others. After a few weeks or months, when the animal has been trained to use the sod surface, it can be replaced with artificial turf, which is long lasting and maintains its appearance without any need for water or maintenance. Artificial turf has another advantage in that it can be used with a wide variety of odor reducing cleaning enzymes, or high pressure water, steam, or mechanical cleaning tools, without any deleterious effects on the turf, whereas live grass may be damaged by such treatment. Artificial turf may also be laundered in a washing machine. Alternatively, worn-out soil-less sod may be replaced with more soil-less sod. Sod with soil may also be used as a toileting surface 15. Also, an absorbent material will be used as a toileting surface. Such a toileting surface may incorporate a plastic or other impermeable layer, underlying the absorbent material so that any liquids will stay in the absorbent material and not drain onto the catchment surface. 26 A disposable item that can be changed frequently, and is equipped with deodorant or other odor-fighting materials and/or anti-bacterial or sanitizing agents. The animal toileting device will be equipped with several rinsing nozzles 17 inside the cleaning cover. 16 The rinsing element 17 will be comprise of a hose with or without a nozzle, a sprinkling head, or one or more lawn sprinkler heads mounted into the cleaning cover 16, platform, or other suitable structure, and will penetrate the toileting surface. 15 The sprinkler head 17 will be plumbed within the cleaning cover 16, with a fitting for a garden hose or other suitable water source or tank. 6 The water tank will be equipped with a heating coil 13 to ensure that the water is warm enough to help remove any residual waste from the platform surface 15. If by other sources or tank, the water is pumped into the cleaning cover 16 and vacuum head 5, which is adapted to have a short circumference or simple a flooding function, sprays the toileting surface with water 17, rinsing waste off of the toileting surface 15 and onto the catchment surface 26, where the water flows into the drain and into the collection element. The water volume must be maintained, so that the catchment area is not overly burden with water in a set period of time.

As shown in FIG. 2 The flow must be corrected in order to insure that the rinsing area 15 in not overly burdened.

As shown in FIG. 7 An additional relief valve 22 is placed, as a redundancy protocol, so that the liquid will not be able to back up into the liquid waste hose and reenter the unit.

A dispensing element is employed to dispense odor-reducing, cleaning, or sanitizing chemical or enzymes into the rinsing liquid. Numerous siphon mixers are available that attach to a hose bib or faucet, and then attach to the hose for automatic mixing as the water flows. The enzymes or other agents introduced into the rinsing liquid in this manner may also be for assisting biodegradation or dissolving of solid waste or liquid waste.

As shown in FIGS. 4, a heating element 13 is placed into the unit's water tank 6 to ensure the solid waste is dissolved for disposal. The device may also be equipped with an actuator element, which triggers the rinsing liquid to flow into the rinsing element 17. Actuator elements may comprise a variety of mechanisms, including but not limited to a timer, a moisture sensor, a weight sensor, an IR sensor, a motion sensor, light beam, or other suitable device. A timer is connected with a hose bib or faucet, or permanently plumbed, so that it allows water to flow for a certain time period, or at a user-selected interval. A water timer is installed to monitor the water flow within the unit. Alternatively, a moisture sensor 18 is used to determine if an animal has deposited sufficient liquid waste on the toileting surface, which will then trigger a valve to allow the cleaning cover 16 to deploy, in order to supply water for a short interval after the animal has departed the toileting area. 15 A logic chip required to ensure a minimum time has passed, typically hours, before the valve may be opened again, to prevent too-frequent cycling. The moisture sensor could be typically set at a higher conductivity. A weight sensor, IR (in-frared) sensor, motion sensor, or light beam sensor will also be used either alone or in any combination with each other or the moisture sensor, to detect when the animal has been on the toileting surface and actuate the rinsing element 17, after the animal has departed. Similar logic chips will be programmed with these sensors to prevent too-frequent cycling.

As shown in FIG. 6 In addition to the toileting surface, some animals particularly males, require a target on which to urinate. Thus, the animal toileting device is equipped with a targeting pole extended 19 which will be a relatively vertical member that can be readily rinsed off. The targeting pole will extend from beneath the toileting surface with a grommet/bladder 11 over the top. This will insure that the actuator will never be compromised and the toileting surface is always cleaned properly. To capture the targeting overshoot, raised walls are located around the targeting element to insure that any mis-aimed urine streams drain onto the toileting area 15 and/or catchment surface 26.

As shown in FIG. 9 In an alternative embodiment, the animal toileting device will be equipped with a moving toileting surface 15 with a blade 27 to move the solid waste into position. The cleaning blade will move the solid waste into position and into the solid waste receptacle 8, where the waste will be collected in a bag and heat sealed. Then the solid waste will be transported to the trash can via the secondary conveyor 14. As shown in FIGS. 8, a support or reinforcement plate 24 is integrated with the platform, to insure addition support of the toileting area for larger animals.

As shown in FIG. 5 Underneath the support surface at the same distance, is a catchment surface 26 that is sloped and/or channeled towards a drain. The channeling to the drain is angled and gravity feed underneath the toileting surface. 15 The drain is fitted to a disposal tube 10, such as a hose, pipe, or other liquid conveyance, as described above, and said disposal tube is routed to a nearby disposal location.

As shown in FIG. 8 To move the toileting surface 15, a front roller/gear 20 may be located in proximity to the leading edge of the support aluminum rod 1 and extend beyond the ends of the support surface towards the solid waste receptacle. Although two gears 20 are installed, the gear nearest the widest point of the toilet surface 15 is the only gear that needs too engaged during waste removal. The other gear is used to return the surface area to its place of origin. In a preferred embodiment, the toileting surface 15 may be comprised of a continuous loop of material, routed over the support surface, around the front roller and under the support surface to the front roller/gear, and the continuous loop of material is routed around both rollers and over and under the support surface. Alternatively, the support surface could have sufficiently rounded and smooth ends such that rollers are not required at either or both ends of the support surface, and the front roller/gear 20 for driving purposes may be located at some other convenient location. The toileting surface 15 is comprised of a variety of materials, such as a flexible and permeable artificial turf, through a water impeller or turbine, which drives a mechanism coupled with at the first roller to turn that roller and move the toileting surface 15. Steam could be used if there is a source of power to generate the steam. Manual cranks is used for the drive element, which reduce the complexity and increase the reliability of the drive mechanism. A small crank that is permanently or detachably coupled with the front roller/gear, which turns the roller and moves the toileting surface.

As shown in FIG. 2 The crank is directly connected with the roller, 20 or indirectly connected through gears, belts chain, or other suitable mechanisms. It is used around the aluminum support rod. 1 Such a mechanism is ideally suited for the embodiment using the absorbent material for the toileting surface 15. The absorbent material embodiment is used with the drive element discussed above. A second gear 20 is installed, in order to bring the surface material back to its place of origin.

As shown in FIG. 4 This embodiment is equipped within the cleaning cover 16, with an actuator element similar to those discussed above, including but not limited to a timer, a moisture sensor, a weight sensor, or IR sensor, a motion sensor, light beam, or other suitable device. 18 The actuator element is actuated by any combination of the above-described elements, including any combination of the rinsing element 17, the drive element, and the sanitation element. The spray nozzles 17 also resides in the cleaning cover. 16 The embodiment that employs the absorbent material for the toileting surface is also used with an actuator element that triggers the toileting surface to move to a fresh surface at some set frequency, such as once or twice a day, or other suitable interval. This embodiment is equipped with solid waste receptacle. 8 Such an element is comprised of a collection surface 15 and solid waste container 9. The solid waste receptacle is located in proximity to the front roller, or very close to the end of the support aluminum rod 1, such that the edge of the solid waste receptacle 8 is close to the toileting surface. The top edge of the solid waste receptacle is extended the full width of the toileting surface by a chain, or motor driven device in order to place the waste receptacle into the proper position. Once the waste has been collected, the waste receptacle will move back to its place of origin for waste disposal.

As shown in FIG. 8 The targeting pole is retracted back into the targeting pole housing 23 into the base of the unit during cleaning.

As shown in FIG. 6 Once the surface is cleaned, the targeting pole 19 will return to its place of origin. At the same time, the targeting pole grommet 11 will also be extended.

As shown in FIG. 4 Once the cleaning cover 16 is down, the cleaning head/vacuum 5 will clean the surface and remove any solid waste that may be left behind. The cleaning cover 16 is comprised of the following, the cleaning spray nozzles 17, and a number of motion sensors 18, light sensors 18, IR sensor 18 or a combination of all, will be place into the cleaning cover 16, in order to determine where, if any, solid waste has been deposited. If no solid waste has been detected, then only the spray nozzles 17 will be activated in order to remove any remnants of liquid waste that the animal may have left behind. If solid waste is detected by the cleaning cover sensors 18, then the cleaning cover will return to its place of origin in an upright position. After the sensor 18 identifies the placement of the solid waste, the platform 15 will start to move slowly towards the solid waste receptacle 8. At that time, the platform surface 15 will be lifted by the hydraulic jack 3 into position above the waste receptacle. Sensors 18 will relay the position of the solid waste to the waste receptacle. At that time, the waste receptacle 8 will move into position to receive the solid waste.

As shown in FIG. 9 The platform is raised by the hydraulic jack 3. Once the toilet surface is in position, the cleaning blade 27 will move into position. Once the waste is deposited into the waste receptacle 8, the platform will return to its place of origin for additional cleaning.

As shown in FIG. 4 Once any waste has been collected into the waste receptacle 8 and properly bagged, bag cut and sealed, the waste will be deposited onto the conveyor 14 for waste removal. The bag has now been deposited onto the conveyor, then a drive unit will be activated. With the drive unit activated, the conveyor 14 with transport the bag of solid waste to a trash receptacle 9. By using this method, the unit is almost done. With regards to the trash receptacle, it also will be fitted with a sensor to identify exactly when the trash should be emptied. The sensor 18 whether motion, IR, light or time sensor is placed near the top of the trash receptacle 9 to notify the user that the trash is full. The cleaning cover with the spray nozzles and sensors will move back into position for cleaning of the platform 15.

As shown in FIG. 10 Once the cover 16 is over the platform surface, the surface will be sprayed with an abundance of water and disinfectant. The cleaning head/vacuum 5 will leave its housing to clean the entire surface of the platform. Once cleaned, the cleaning head will retreat to its housing for storage and cleaning. The cleaning cover 16 will return to the upright and stored position.

As shown in FIG. 6 The targeting pole 19 will extend and return to the top of the platform for the next use, with the targeting grommet 11, which will also be extended.

As shown in FIG. 4 To power the unit, this unit will be equipped with a solar panel 12 and batteries.

As shown in FIG. 2 The battery housing 4 is located in the base of the unit. It will also have a AC plug for any place that doesn't have enough sunlight to sustain the unit. By utilizing a solar panel, the unit has become more effective with regards to placement and usage. The unit will have the ability to be placed virtually anywhere there is an abundance of sunlight. By equipping the unit with a solar panel, you have eliminated the need for external power to the unit. At this point, the unit is used at home, work, animal parks or even strategically placing several units within neighborhoods or even at an airport or bus depot.

While the present invention has been described with regards to particular embodiments, it is recognized that additional variations to the present invention may be devised without departing from the inventive concept. Several aluminum rods 2 are installed to help support the weight of the animal.

As shown in FIG. 1 The base 25 will house beneath it, multiple items, including the battery housing, hydraulic jack, support beams, the targeting pole housing, targeting pole. The base will also contain the toileting area 15 and targeting pole grommet. 11

What is claimed is:

1. An animal toileting device, comprising:

a platform;

a slanted catchment surface for gravity-feed, supported by the platform;

a lip at least partially surrounding the slanted catchment surface;

a permeable toileting surface atop the slanted catchment surface;

a cleaning cover including sprinklers heads and sensors;

a fitting for a water connection, said fitting connected with plumbing;

said sprinkler heads further connected with the plumbing and configured to direct water onto the permeable toileting surface;

a solar panel with a backup battery system;

a drain opening located in the slanted catchment surface;

a plurality of widely-spaced drainage channels inset in the slanted catchment surface sloping downward toward the drain opening;

a disposal tube adapted to fit the drain opening;

a conveyor configured to separate and remove solid waste away from the platform;

a heating element configured to heat-seal a bag containing the solid waste prior to being transported on the conveyor; and wherein the disposal tube provides a liquid conveyance for transporting liquid waste to a collection area that is separate from the solid waste.

2. The animal toileting device of claim 1, further comprising:

an actuator element configured to actuate a rinsing element of the sprinkler heads.

3. The animal toileting device of claim 1, further comprising:

a targeting element configured to provide a target on which to urinate;

said targeting element covered with a rubber grummet.

4. The animal toileting device of claim 1, further comprising:

a cleaning head/vacuum configured to clean and remove additional waste.

5. The animal toileting device of claim 4, wherein:

the disposal tube is connected with a drain of the cleaning head/vacuum.

6. The animal toileting device of claim 1, further comprising:

an actuator element configured to actuate a roller/gear of the permeable toileting surface.

* * * * *